(12) United States Patent
Foulsham et al.

(10) Patent No.: US 9,954,407 B2
(45) Date of Patent: Apr. 24, 2018

(54) TOOTH FOR AN ELECTRIC MOTOR OR GENERATOR

(71) Applicant: PROTEAN ELECTRIC LIMITED, Surrey (GB)

(72) Inventors: John Foulsham, Hampshire (GB); Gareth Roberts, Newhaven (GB); Jamie Bell, Berkshire (GB)

(73) Assignee: PROTEAN ELECTRIC LIMITED (GB)

( * ) Notice: Subject to any disclaimer, the term of this patent is extended or adjusted under 35 U.S.C. 154(b) by 450 days.

(21) Appl. No.: 14/435,729

(22) PCT Filed: Oct. 15, 2013

(86) PCT No.: PCT/IB2013/059368
§ 371 (c)(1),
(2) Date: Apr. 14, 2015

(87) PCT Pub. No.: WO2014/060947
PCT Pub. Date: Apr. 24, 2014

(65) Prior Publication Data
US 2015/0270756 A1    Sep. 24, 2015

(30) Foreign Application Priority Data
Oct. 15, 2012   (GB) .................................. 1218475.0

(51) Int. Cl.
*H02K 1/04* (2006.01)
*H02K 3/34* (2006.01)
(Continued)

(52) U.S. Cl.
CPC ............... *H02K 3/345* (2013.01); *H02K 3/30* (2013.01); *H02K 3/32* (2013.01); *H02K 3/522* (2013.01);
(Continued)

(58) Field of Classification Search
CPC .. H02K 3/30; H02K 3/48; H02K 3/50; H02K 3/12; H02K 3/345; H02K 3/32
(Continued)

(56) References Cited

U.S. PATENT DOCUMENTS

| 6,509,668 B2 * | 1/2003 | Berger | H02K 3/487 310/420 |
| 2004/0056538 A1 * | 3/2004 | Du | H01R 43/10 310/43 |

(Continued)

FOREIGN PATENT DOCUMENTS

| EP | 2073355 A1 | 6/2009 |
| WO | 2009029743 A1 | 3/2009 |

(Continued)

OTHER PUBLICATIONS

European Patent Office; International Search Report; dated Feb. 23, 2015; World Intellectual Property Organization; Rijswijk.
(Continued)

*Primary Examiner* — Thanh Lam
(74) *Attorney, Agent, or Firm* — Valerie M. Davis; The Mason Group Patent Specialists LLC (57) ABSTRACT

A stator or rotor for an electric motor or generator comprising a plurality of teeth for receiving coil windings, wherein each tooth has an injection molded plastic layer formed on a plurality of sides of each tooth with a first gap formed in the injection molded plastic layer on a first side of each of the teeth with a first insulation element placed in the first gap formed in the injection molded plastic layer, wherein the injection molded plastic layer and first insulation element are arranged to electrically insulate the plurality of teeth from the coil windings.

21 Claims, 7 Drawing Sheets

(51) Int. Cl.
*H02K 3/30* (2006.01)
*H02K 3/52* (2006.01)
*H02K 3/32* (2006.01)
H02K 1/14 (2006.01)
H02K 9/22 (2006.01)

(52) U.S. Cl.
CPC ............. *H02K 3/527* (2013.01); *H02K 1/148* (2013.01); *H02K 9/22* (2013.01)

(58) Field of Classification Search
USPC .................................................. 310/43, 194
See application file for complete search history.

(56) References Cited

U.S. PATENT DOCUMENTS

| | | | |
|---|---|---|---|
| 2006/0055263 A1* | 3/2006 | Kim | ...................... H02K 1/2773 310/156.08 |
| 2010/0213784 A1 | 8/2010 | Iizuka et al. | |
| 2013/0033132 A1* | 2/2013 | Jayasoma | .............. H02K 1/148 310/43 |
| 2013/0249327 A1* | 9/2013 | Gianni | ................... H02K 1/148 310/43 |

FOREIGN PATENT DOCUMENTS

| WO | 2010086997 A1 | 8/2010 |
|---|---|---|
| WO | 2012090424 A1 | 7/2012 |
| WO | 2013005537 A1 | 1/2013 |

OTHER PUBLICATIONS

European Patent Office; Written Opinion of the International Search Authority; dated Apr. 15, 2015; World Intellectual Property Organization; Rijswijk.

Intellectual Property Office; Search Report; dated Dec. 6, 2012; Intellectual Property Office; South Wales.

* cited by examiner

TOOTH FOR AN ELECTRIC MOTOR OR GENERATOR

The present invention relates to a tooth for a stator or rotor, and in particular a tooth for an in-wheel electric motor or generator stator or rotor.

Stators are well known as the stationary part of an electric motor or electric generator relative to which a rotor turns. Stators generally comprise a magnetic component and other structural components. Electric motors work on the principle that a current carrying wire will experience a force in the presence of a magnetic field. Typically a rotor, carrying a set of permanent magnets, is arranged to rotate about a set of coils that are arranged to carry an electric current, resulting in the rotor rotating about the stator and generating movement. It will be appreciated that it is also possible for the rotor to carry a set of coils and the stator to carry a set of permanent magnets.

Figure 1:
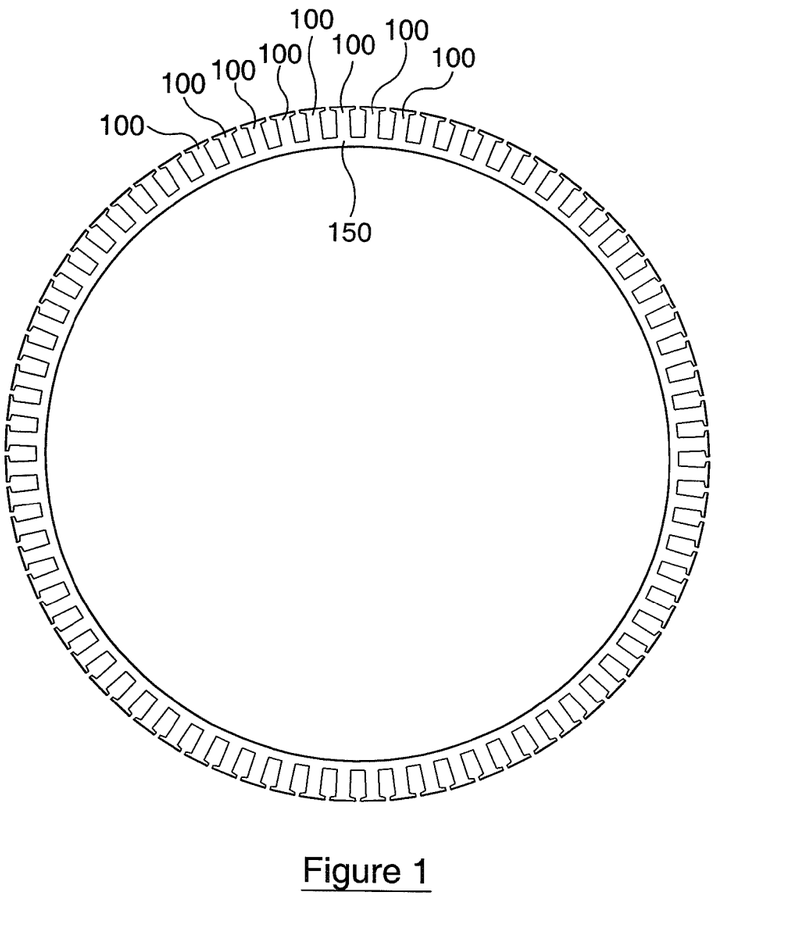
FIG. 1 illustrates a prior art example of a stator formed as a single piece with integral teeth.

An example of a stator, which is arranged to be mounted within a rotor, is shown in FIG. 1. FIG. 1 shows the back-iron of a stator formed of a single piece of material, for example from PM (powder metal) or more commonly built up of a number of identical laminations. The protrusions 100 from the circular support 150 (also known as a back iron or back ring) are known as "teeth" and are used to receive a plurality of coil windings. To increase performance of a motor it is desirable to optimise the total cross-section of the coil windings, which would have the effect of reducing resistance, thereby reducing heat generation. Additionally, with the coil windings being in closer proximity, this would have the effect of improving thermal conductivity, which would have the effect of increasing motor efficiency with improving continuous performance.

However, with an arrangement such as that shown in FIG. 1, where the entire stator is formed of a single solid piece, it will be appreciated that there is a limited amount of space to physically wind the wire coils about the teeth. Therefore, it is common in such arrangements for there to be gaps between the coils of adjacent teeth, which is inefficient since this space could otherwise be filled with wire coils to increase the total cross-section of the coil windings.

Additionally, traditional ways of providing coil insulation between a stator and coil windings can result in poor thermal conductivity, which can limit the performance of an electric motor.

Further, large single piece stators typically require complex winding machines and complex winding processes to perform the required coil windings.

One solution to this problem has been the development of radially mounted stator teeth that are mounted to a stator back-ring after coil windings have been formed around the stator teeth, thereby allowing the space between coils on adjacent stator teeth to be minimised.

This has the additional advantage of allowing an insulation layer in the form of an injection moulded plastics layer (i.e. an over moulded layer) to be applied to the respective teeth prior to the coil windings being wound around the stator teeth. The use of an over moulded layer applied to single stator tooth can minimise the risk of any air gaps forming between the insulation layer and the stator tooth, thereby providing an electrical insulation layer between the coils and the stator while also improving thermal conductivity.

Further, the use of an injection moulded plastics layer has the additional advantage of allowing coil retaining features to be formed in the injection moulded plastics layer for facilitating the guiding of the coil windings around the tooth and as a guide for certain portions of the coil windings.

However, due to the high pressures present during the injection moulding process it is possible for the injection moulding process to distort the tooth to which the injection moulded plastics layer is being applied, thereby preventing the mounting of the tooth to the stator back-ring.

Accordingly, it is desirable to improve this situation.

In accordance with an aspect of the present invention there is provided a stator, rotor, tooth or method according to the accompanying claims.

The invention provides the advantage of reducing the risk of the injection moulding process distorting the tooth when the injection moulded plastics layer is being applied to the tooth, thereby allowing the tooth to be designed with less structural support which allows a reduction in cost, weight and complexity of a tooth. Additionally, an insulation element used to fill a gap formed in the injection moulded plastics layer can be made of a different material to the injection moulded plastics layer, thereby allowing the insulation element to have improved strength characteristics more suited for facilitating the guiding of certain portions of the coil windings.

The present invention will now be described, by way of example, with reference to the accompanying drawings, in which.

Although embodiments of the invention will now be described in relation to a stator for an electric motor, it should be appreciated that the invention applies equally to rotor arrangements in the instance of electric motors in which the rotor carries the coils. The invention also applies equally to electric generators. Although the present embodiment describes an electric motor having a stator and rotor, where the stator and rotor have a circumferential support, the invention is equally applicable to electric motors having stators and rotors with a different configuration, for example a linear electric motor. Accordingly, the term rotor is intended to cover the moving component of an electric motor irrespective of the shape of that component and as such is intended to cover a forcer in a linear electric motor.

Figure 2:
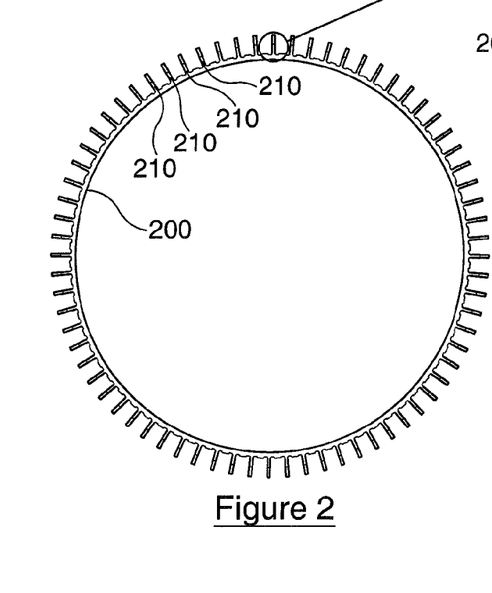
FIGS. 2, 2a, 2b illustrates a stator circumferential support according to an embodiment of the present invention.
Figure 2A:
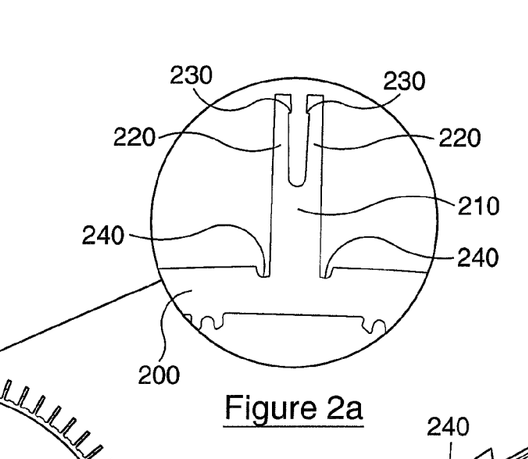
Figure 2B:
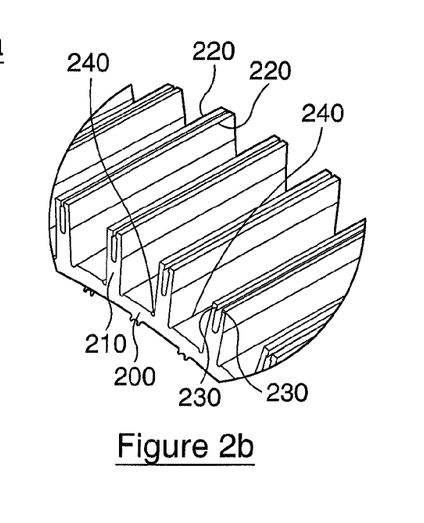

In accordance with a first embodiment of the invention, FIG. 2 illustrates a circumferential support 200. Distributed about the outer circumference of the circumferential support 200, that is to say stator back-ring, are a plurality of protrusions 210 that extend in a radial direction, which are illustrated in greater detail in FIGS. 2a and 2b. The plurality of protrusions 210 extend outwardly away from the outer surface of the stator back-iron 200.

The stator back-iron 200, including the protrusions 210, are formed as a single piece, integral, structural component. For example the stator back-iron 200 can be moulded from powder metal, or more commonly, built up of a number of identical laminations, where the laminations will typically be manufactured from sheets of steel, such as electrical steel, however any material with appropriate strength and electromagnetic properties can be used. The laminations may also have an insulating coating on the surface and along the curved interface shape between teeth stacks and stator back-ring (i.e. circumferential support 200) to prevent eddy currents from flowing between the laminations.

The laminations can be produced by any suitable means, for example stamping or cutting the desired shape from a sheet of the required material or laser etching. As an example, the laminations may have a thickness of between 0.3 and 0.4 mm and preferably around 0.35 mm.

Each of the protrusions 210 formed on the stator back-iron 200 are arranged to receive a stator tooth, where each of the protrusions and respective stator teeth include engagement means to allow the respective stator teeth to be mounted to a respective protrusion 210 in a radial direction, as described below. However, any means for mounting the stator tooth to the stator back-iron may be used.

For the purposes of the present embodiment, formed on the end portion of each of the protrusions 210, farthest away from the stator back-iron 200, are two resilient elements 220 extending radially away from the stator back-iron 200, where a gap is formed between the two resilient elements 220. The gap between the two resilient elements 220 forms a radial slot at the end of the projections that is substantially orthogonal to the circumferential plane of the stator back-iron 200. The radial slot is arranged to receive a stator tooth engagement element, as described below.

The end portion of each of the resilient elements 220, that is to say the portion of the resilient elements 220 furthest from the stator back-iron 200, include a projecting portion 230 on an inner surface of the resilient elements 220 that extend towards each other in a circumferential direction with respect to the stator back-iron that are arranged to latch with a stator tooth engagement element, as described below.

Figure 3:
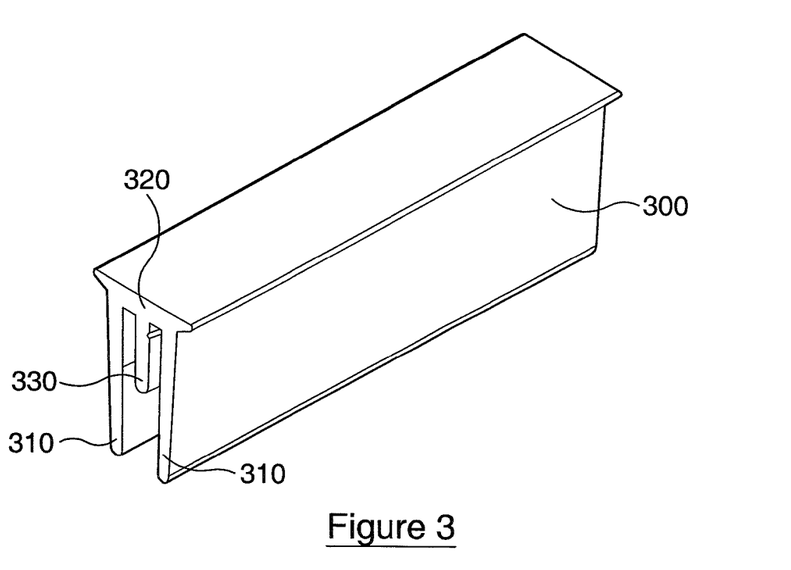
FIG. 3 illustrates a stator tooth according to an embodiment of the present invention.

FIG. 3 illustrates a stator tooth 300 for mounting to the stator back-iron 200 illustrated in FIG. 2. The stator tooth 300 includes two wall sections 310 that are coupled together via a stator tooth top portion 320. To aid the retention of coil windings mounted on the stator tooth 300, the top portion 320 of the stator tooth extends laterally over the tooth wall sections 310 to form a laterally extending stator tip. The outer portions of the two wall sections 310 form two sides of the tooth with the two end sections of the tooth forming two other sides of the tooth.

A recess is formed between the two tooth wall sections 310 of the stator tooth, with an engagement element 330 formed in the recess. The engagement element 330 is arranged to engage with the resilient elements 220 of a projection, as described below.

The stator tooth engagement element 330 extends from the centre portion of the stator tip 320 down into the recess formed between the two tooth wall sections 310, with the engagement element 330 tapering outwardly from the tip of the engagement element 330 up towards the stator tip 320, where the main external surfaces of the two wall sections form two sides of the stator tooth. The top portion of the engagement element 330, which abuts the stator tip, is arranged to have a narrowed section that is configured to interlock with the upper portions of the resilient elements 220 of a projection 210. The profile and dimensions of the slot formed between the two resilient elements 220 of a protrusion 210 are arranged to substantially correspond to the outer profile and dimensions of the engagement element 330 formed in the recess of a stator tooth 300.

As the stator teeth 300 are separate from the stator back-iron 200 they can be pre-wound with coil windings before the stator teeth 300 are mounted to the stator back-iron 200 with the advantage that the winding of coils on the teeth is easier than if the teeth were integral to the stator support.

To mount the stator teeth 300 to the stator back-iron 200 the stator teeth 300 are radially pressing onto a respective protrusion 210 formed on the stator back-iron 200. Sufficient radial force is applied to a stator tooth 300 to force the stator tooth engagement element 330 to interlock with the two resilient elements 220 of a protrusion 210.

In particular, when a stator tooth 300 is to be mounted to the stator back-iron 200 the stator tooth 300 is positioned over a protrusion 210 so that the tip of the stator tooth engagement element 330 engages with the gap formed between the top of the two resilient elements 220 of a protrusion 210.

The stator tooth 300 is then radially pressed against the protrusion 210 causing the tapered portion of the engagement element 330 to apply a tangential force to the inner surfaces of the resilient elements 220, thereby causing the two resilient elements 220 to be forced apart allowing the engagement element 330 to move down between the two resilient elements 220.

As the profile and dimensions of the engagement element 330 match that of the slot formed between two resilient elements 220, once the stator tooth 300 has been fully inserted on the protrusion 210 the spring force in the resilient elements 220 force the projection portions 230 on the inner surfaces of the resilient elements 220 into the narrowed section of the engagement element 330, thereby interlocking the stator tooth 300 and the stator back-iron protrusion 210 and preventing the removal of the stator tooth 300 from the stator back-iron 200. The end portions of each of the stator tooth wall sections 310 sit in a respective recess formed at the base of the protrusion 210, thereby providing support against tangential forces applied to the stator tooth 300. However, as stated above, any means for mounting the stator tooth to the stator back-iron may be used.

Preferably, an adhesive is applied to one or more surfaces on a stator tooth 300 and/or a protrusion 210, which abut when the stator tooth 300 is mounted to the protrusion 210, for example on an outer surface of one or both of the resilient elements 220. The application of an adhesive to one or more surfaces of the stator tooth 300 and/or protrusion 210 helps to minimise micro-movement of the stator tooth 300 and local vibration of the tooth 300 relative to the stator back-iron 200. To aid thermal conductivity between the stator tooth 300 and the stator back-iron 200 the adhesive is preferably selected to have a good thermal conductivity. The adhesive can also help to electrically isolate the stator tooth 300 from the protrusion 210, thereby helping to minimise eddy currents between stator tooth 300 and the stator back-iron 200.

To aid electrical isolation between the coil windings and the stator tooth 300, prior to the coil windings being applied to the stator tooth, the stator tooth 300 is encapsulated with an insulating material using an injection moulding process (i.e. the stator tooth is over-moulded), as described below. Preferably the insulating material will be a plastics material having a good thermal conductivity, high temperature deflection and good dielectric strength, for example liquid crystal polymer.

As is well known to a person skilled in the art, over-moulding is a process in which plastics material is fed into a heated vessel, mixed and forced onto a surface of a product to form a plastics layer on the product.

Figure 4:
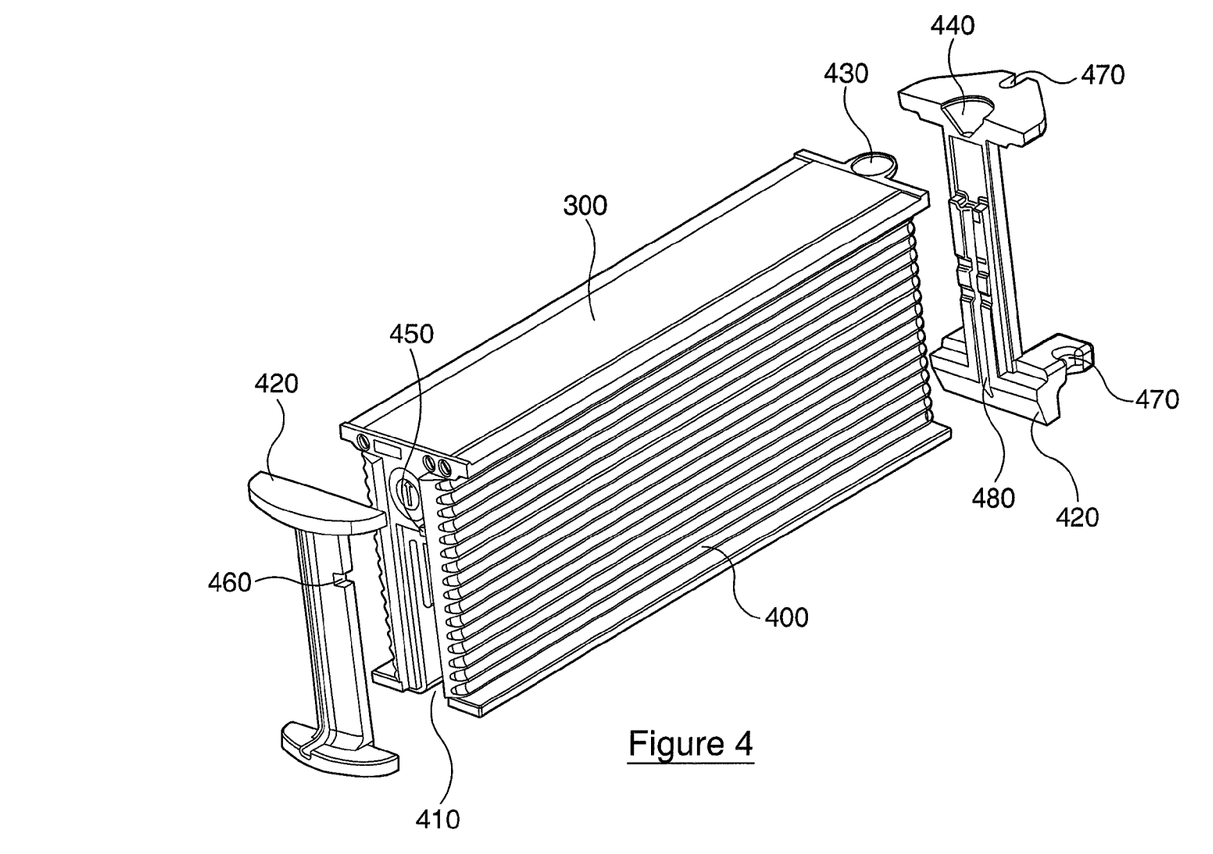
FIG. 4 illustrates the over-moulding of a stator tooth according to an embodiment of the present invention.

As illustrated in FIG. 4, an injection moulded plastics layer 400 is formed around the sides of the tooth 300 with a gap 410 formed in the injection moulded plastics layer 400 on the two end sides of the tooth 300, where the gap 410 in the injection moulded plastics layer 400 extends from the bottom of the tooth 300 to the top of the recess. The injection moulded plastics layer 400 extends up from the bottom of the tooth 300 to the top of the laterally extending stator tip.

By forming a gap in the injection moulded plastics layer 400 on the end sides of the tooth 300, the inward pressure on the two wall sections 310 of the tooth is minimised when the injection moulded plastics layer 400 is being applied to the tooth 300. This avoids the need for structural supports to be placed between the two wall sections 310 for preventing the stator tooth wall sections 310 bending during the injection moulding process. As illustrated in FIG. 4, preferably the gap 410 in the injection moulded plastics layer 400 on the end sides of the tooth 300 extends to the top of the tooth recess.

As illustrated in FIG. 4, the injection moulded plastics layer 400 formed around the sides of the stator tooth 300 includes longitudinal ridges to facilitate winding the coil windings around the tooth 300 and to increase the contact surface area between the injection moulded plastics layer 400 and the coil windings for improved thermal conduction between the coil windings and the injection moulded plastics layer 400.

To aid electrical isolation between the coil windings and the stator tooth 300 at the end sections of the stator tooth 300, an electrically insulating element 420 is placed in the gaps 410 formed in the injection moulded plastics layer 400 before the coil windings are applied to the stator tooth 300. The electrically insulating elements 420 are arranged to electrically insulate the end sections of the tooth 300 from the coil windings wound around the tooth 300.

Although the preferred embodiment uses two insulating elements 420 placed in two gaps 410 formed in the injection moulded plastics layer 400, the injection moulded plastics layer 400 can be applied with a single gap 410 formed in the injection moulded plastics layer 400 at one end side of the tooth 300 with a single insulating element 420 being used to provide insulation at the end section of the tooth 300.

Preferably, the two insulation elements 420 have keying features that are arranged to match corresponding features formed in the injection moulded plastics layer 400 for facilitating the correct placement of the two insulation elements 420 in the respective gaps 410 formed in the injection moulded plastics layer 400. For the purposes of the present embodiment, an extended lip 430 is formed at the top of the injection moulded plastics layer 400 at one end of the stator tooth 300, with a corresponding recess 440 formed in the associated insulation element 420. On the other end of the stator tooth 300, a keying element 450 is formed on the edge of the injection moulded plastics layer 400 two thirds of the way up from the bottom of the stator tooth 300 with a corresponding recess 460 formed in the associated insulation element 420. However, any form of keying feature may be used.

Figure 5:
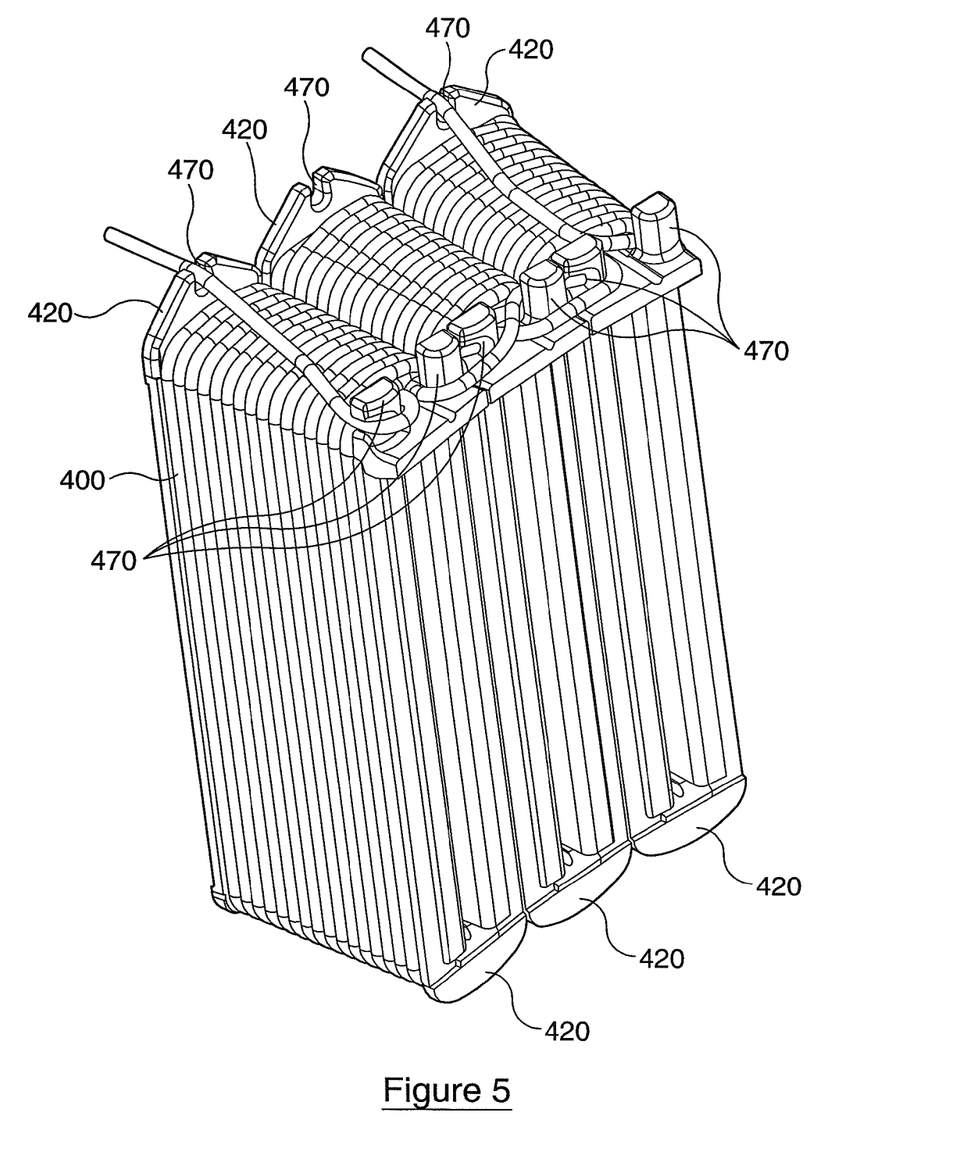
FIG. 5 illustrates three stator teeth according to an embodiment of the present invention.

Preferably at least one of insulation elements 420 includes at least one guiding feature 470 for aiding in the routing of a portion of the coil windings. For example, FIG. 5 provides an illustration of three stator teeth 300 that have been wound with a coil winding, where the insulation elements 420 mounted in the gap 410 formed in the injection moulded plastics layer 400 at one end of the stator teeth 300 have three guiding features 470 to facilitate the routing of coil windings to and from the stator teeth 300 and between the stator teeth 300. A first guiding element 470 is provided at the top of the insulation element 420 for routing coil windings to/from a stator tooth 300 with two guiding elements 470 provided at the bottom of the insulation element 420 for routing coil windings between stator teeth 300.

Preferably, the injection moulded plastics layer 400 and the first and/or second insulation elements 420 are made of different materials.

Preferably the over-moulded material is selected to have good thermal conductive properties, thereby aiding thermal conductivity between the coil windings and the stator tooth 300. However, an over-moulded material selected for its optimum thermal conductive properties may not provide the optimum mechanical strength requirements required for guiding/routing portions of the coil windings. Accordingly, by having insulation elements 420 located at the end sides of the stator teeth 300 that do not form part of the injection moulded plastics layer 400 it is possible to select different materials for the insulation elements 420 and the injection moulded plastics layer 400 based on different priorities. For example, the material for the insulation elements 420 can be selected for optimum strength with the material for the injection moulded plastics layer 400 being selected for optimum thermal conductivity. As such, the injection moulded plastics layer 400 may have a higher thermal conductivity than the insulation elements 420 with the insulation elements 420 having great mechanical strength than the injection moulded plastics layer 400. An example of a suitable injection moulded plastics layer would be Cool-Poly® Thermally Conductive Liquid Crystalline Polymer. An example of a suitable material for the insulation elements would be Nylon PA66.

Preferably, at least one of the insulation elements 420 have a channel 480 formed on an inner surface of the insulation elements 420 for allowing potting or adhesive material to be channeled into the tooth recess when the insulation elements 420 are placed in the gaps formed in the injection moulded plastics layer 400 and the associated tooth 300 has been mounted to the stator back-iron 200.

By having a channel 480 formed on an inner surface of an insulation element 420 it is possible for potting or adhesive material to be applied up through the channel to surfaces of the stator tooth recess and the stator back-iron after the stator tooth 300 has been mounted to the stator back-iron, where the potting material can be used to aid the mounting of the stator tooth 300 to the stator back-iron 200.

As stated above, to aid thermal conductivity between the stator tooth 300 and the stator back-iron 200 the adhesive/potting material is preferably selected to have a good thermal conductivity. The adhesive/potting material can also help to electrically isolate the stator tooth 300 from the protrusion 210, thereby helping to minimise eddy currents between stator tooth 300 and the stator back-iron 200.

Figure 6:
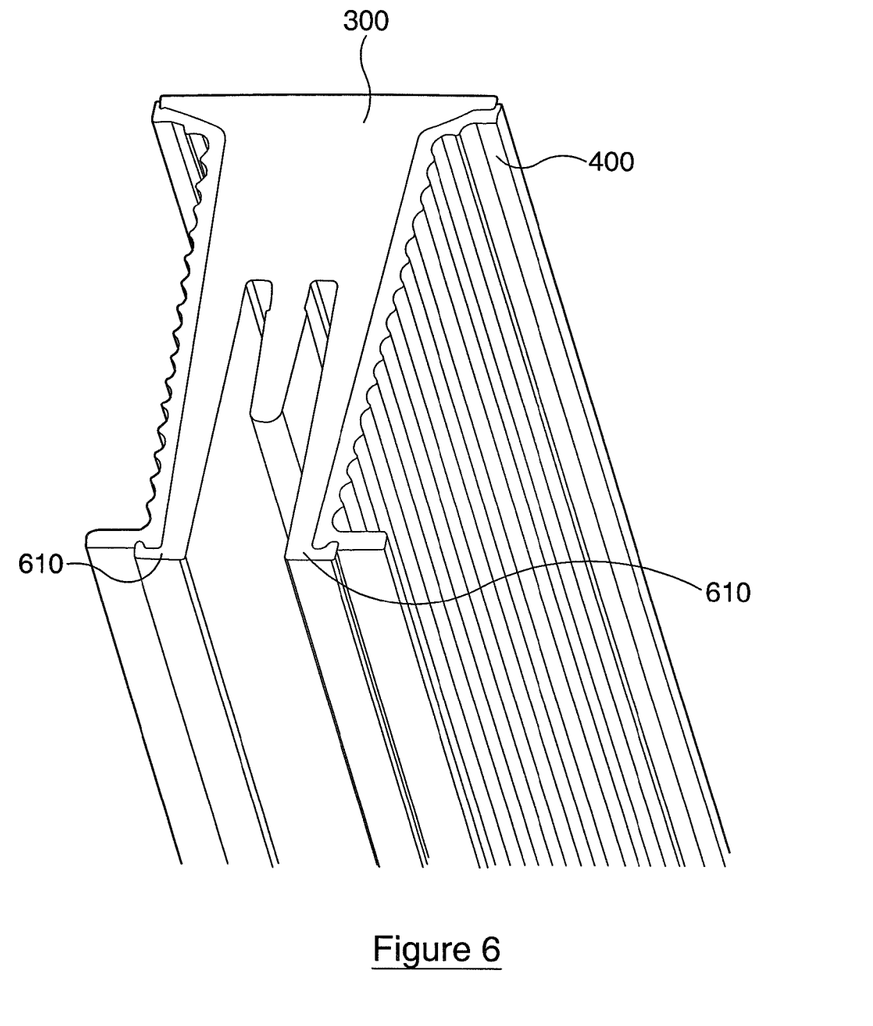
FIG. 6 illustrates a cross section of the over-moulded stator tooth illustrated in FIG. 4.

Preferably at least one side of the tooth 300 includes a retaining feature 610 over which the injection moulded plastics layer is formed for preventing the injection moulded plastics layer 400 from peeling away from the side of the tooth 300. For example, as illustrated in FIG. 6, which shows a cross section of the stator tooth illustrated in FIG. 4, a lip section 610 that extends in a direction substantially non perpendicular to the side of the tooth 300 is formed at substantially the base of the two wall sections 310 of the tooth 300 to form a U shaped section, which acts to retain the bottom portions of the injection moulded plastics layer 400 to the bottom wall portions of the stator tooth 300.

Preferably, the over-moulding process will include features that aid the retention of the coil windings on the stator tooth 300, for example a ridge formed at the bottom of the over-moulding.

Once the stator tooth 300 has been over-moulded and the insulating elements 420 have been placed in the gaps 410 formed in the end sides of the over-moulding, coil windings are applied to the stator tooth 300.

Figure 7:
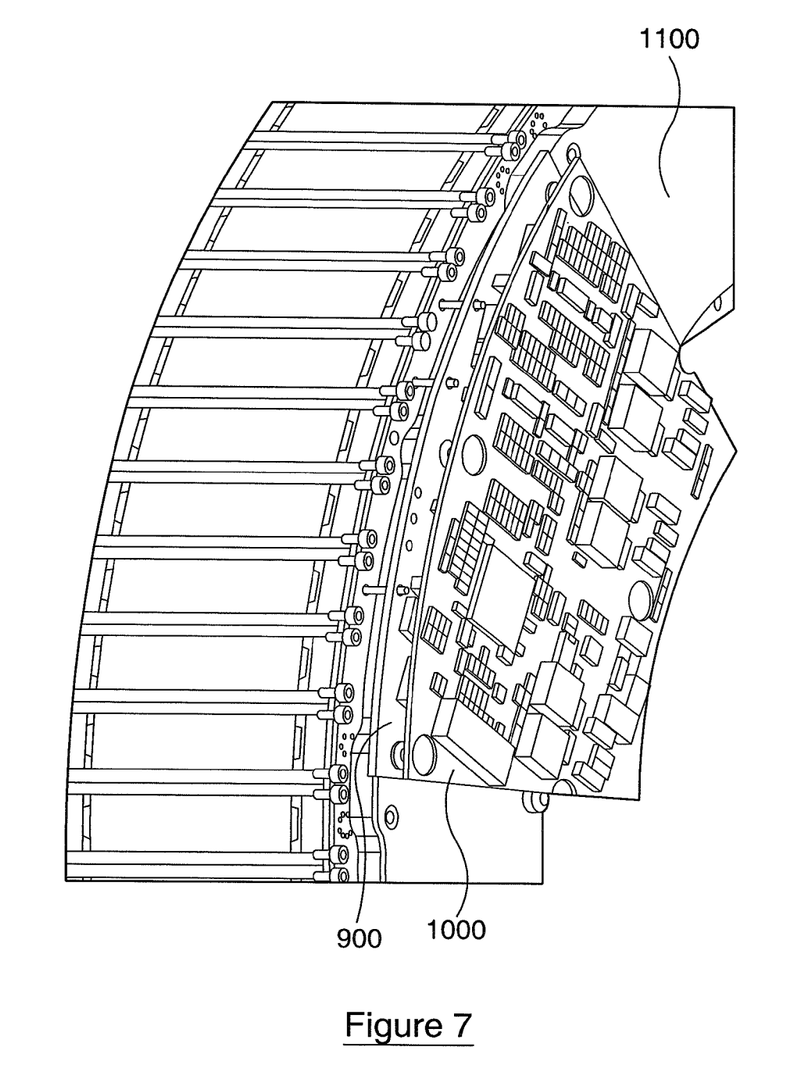
FIG. 7 illustrates a stator according to an embodiment of the present invention.

As illustrated in FIG. 7, a control board 1000 and power board 900, which act as an inverter, are mounted adjacent to the stator teeth, where coil windings formed around the stator teeth 300 are connected to the power board 900 and/or control board 1000. The control board 1000 and power board 900 are arranged to control the current flow in coil windings. A single control board and power board could be arranged to control current flow in all motor coil windings or a subset of coil windings. If a single control board and power board are arranged to control current in a subset of coil windings, preferably the electric motor would include a plurality of control boards and power boards to control the current flow in the different subset of coil windings.

Preferably, to aid cooling of the electric motor, a heat sink 1100 is mounted to the stator.

For the purposes of the present embodiment, a fully assembled stator includes 72 stator teeth, however any number of teeth can be used, where preferably the number is between 50 and 100.

A stator constructed according to the above embodiment finds particular utility in electric motors for electric vehicles. In particular, embodiments of the invention may be incorporated into road going electric vehicles and more specifically electric vehicles having one or more in-wheel electric motors.

The invention claimed is:

1. A stator or rotor for an electric motor or generator comprising a plurality of teeth for receiving coil windings, wherein each tooth has an injection moulded plastics layer formed on a plurality of sides of each tooth with a first gap formed in the injection moulded plastics layer on a first side of each of the teeth with a first insulation element placed in the first gap formed in the injection moulded plastics layer, wherein the injection moulded plastics layer and first insulation element are arranged to electrically insulate the plurality of teeth from the coil windings.

2. A stator or rotor according to claim 1, further comprising a circumferential support having a plurality of first engagement means distributed about the circumferential support; wherein each tooth includes second engagement means for engaging with a first engagement means on the circumferential support for allowing each tooth to be mounted to a first engagement means in a radial direction.

3. A stator or rotor according to claim 2, wherein the first engagement means are protrusions on the circumferential support and the second engagement means are interlocking means formed within a recess of the tooth.

4. A tooth for mounting to an electric motor or generator with a circumferential support having a plurality of first engagement means distributed about the circumferential support, the tooth comprising second engagement means for engaging with a first engagement means on the circumferential support for allowing the tooth to be mounted to a first engagement means in a radial direction; and an injection moulded plastics layer formed on a plurality of sides of the tooth with a first gap formed in the injection moulded plastics layer on a first side of the tooth with a first insulation element placed in the first gap formed in the injection moulded plastics layer, wherein the injection moulded plastics layer and first insulation element are arranged to electrically insulate the tooth from coil windings arranged to be wound around the tooth.

5. A stator or rotor according to claim 1, wherein the first engagement means are protrusions on the circumferential support and the second engagement means are interlocking means formed within a recess of the tooth.

6. A stator or rotor according to claim 1, wherein a second gap is formed in the injection moulded plastics layer on a second side of the tooth with a second insulation element placed in the second gap formed in the injection moulded plastics layer.

7. A stator or rotor according to claim 6, wherein the first gap and second gap are formed on opposite sides of the tooth.

8. A stator or rotor according to claim 1, wherein the injection moulded plastics layer and the first insulation element are made of different materials.

9. A stator or rotor according to claim 6, wherein the injection moulded plastics layer and the second insulation elements are made of different materials.

10. A stator or rotor according to claim 1, wherein the injection moulded plastics layer has a higher thermal conductivity than the first insulation element.

11. A stator or rotor according to claim 6, wherein the injection moulded plastics layer has a higher thermal conductivity than the first and second insulation element.

12. A stator or rotor according to claim 1, wherein the first insulation element has keying features that are arranged to match corresponding features formed in the injection moulded plastics layer for facilitating the correct placement of the first insulation element in the first gap formed in the injection moulded plastics layer.

13. A stator or rotor according to claim 6, wherein the first and second insulation elements have keying features that are arranged to match corresponding features formed in the injection moulded plastics layer for facilitating the correct placement of the first and second insulation elements in the respective first and second gap formed in the injection moulded plastics layer.

14. A stator or rotor according to claim 2, wherein the first insulation element have a channel formed on a surface of the first insulation element for allowing potting material to be channeled into the tooth recess when the first insulation element is placed in the first gap formed in the injection moulded plastics layer.

15. A stator or rotor according to claim 6, wherein the first and second insulation elements have a channel formed on a surface of the first and second insulation elements for allowing potting material to be channeled into the tooth recess when the first and second insulation elements are placed in the respective first gap and second gap formed in the injection moulded plastics layer.

16. A stator or rotor according to claim 1, wherein the first insulation element includes at least one feature for guiding the position of a portion of the coil windings.

17. A stator or rotor according to claim 6, wherein the first and second insulation element includes at least one feature for guiding the position of a portion of the coil windings.

18. A stator or rotor according to claim 1, wherein the injection moulded plastics layer includes ridges for guiding the positions of the coil windings wound around the tooth.

19. A tooth according to claim 4, wherein at least one side of the tooth includes a retaining feature over which the injection moulded plastics layer is formed to restrict movement of the injection moulded plastics layer away from the side of the tooth.

20. A tooth according to claim 19, wherein the retaining feature is a lip that extends in a direction non perpendicular to the side of the tooth.

21. A tooth according to claim 20, wherein the lip is formed at substantially the base of the side of the tooth.

\* \* \* \* \*